US010001062B2

(12) United States Patent
Warnet

(10) Patent No.: US 10,001,062 B2
(45) Date of Patent: Jun. 19, 2018

(54) AIRCRAFT TURBINE ENGINE COMPRISING AN AIR INTAKE HOUSING WITH A VARIABLE AERODYNAMIC PROFILE

(71) Applicant: Airbus Operations S.A.S., Toulouse (FR)

(72) Inventor: Stephane Warnet, Grenade sur Garonne (FR)

(73) Assignee: Airbus Operations S.A.S. (FR)

( * ) Notice: Subject to any disclaimer, the term of this patent is extended or adjusted under 35 U.S.C. 154(b) by 221 days.

(21) Appl. No.: 14/928,302

(22) Filed: Oct. 30, 2015

(65) Prior Publication Data
US 2016/0131038 A1 May 12, 2016

(30) Foreign Application Priority Data
Nov. 6, 2014 (FR) ..................... 14 60717

(51) Int. Cl.
*F02C 7/18* (2006.01)
*F01D 25/12* (2006.01)
(Continued)

(52) U.S. Cl.
CPC ............... *F02C 7/18* (2013.01); *B64D 33/02* (2013.01); *F01D 25/12* (2013.01); *F02C 7/042* (2013.01);
(Continued)

(58) Field of Classification Search
CPC .... F02C 7/18; F02C 7/042; F02C 7/14; F01D 25/12; F01D 25/24; F01D 25/28; F02K 3/075; B64D 33/02
See application file for complete search history.

(56) References Cited

U.S. PATENT DOCUMENTS

| 4,250,703 A | 2/1981 | Norris et al. |
| 4,418,879 A * | 12/1983 | Vanderleest ........... B64D 33/02 137/15.1 |

(Continued)

FOREIGN PATENT DOCUMENTS

| DE | 102011011879 A1 | 8/2012 |
| GB | 2308866 A | 7/1997 |
| WO | 8202181 A1 | 7/1982 |

OTHER PUBLICATIONS

FR Search Report dated (Jul. 28, 2015) (FR 14 60717).

*Primary Examiner* — Woody Lee, Jr.
(74) *Attorney, Agent, or Firm* — Lerner, David, Littenberg, Krumholz & Mentlik, LLP

(57) ABSTRACT

An aircraft turbine engine includes a fan duct having a wall; an air passage arranged in the wall and including an air inlet opening at the wall, the air passage being designed to receive part of the flow of air from the fan duct across the opening; an air intake housing located above the air inlet opening and fixed to the wall, the housing being arranged to intercept part of the air flow in the fan duct, and successively including, in the air flow direction, an upstream wall then a downstream wall, an upstream opening and a downstream opening arranged on the upstream wall and the downstream wall, respectively, the inside of the housing being in fluidic connection to the air inlet opening, and a movable sealing means between an "open" position; and a "closed" position relative to the downstream opening and the air inlet opening.

6 Claims, 6 Drawing Sheets

(51) Int. Cl.
    *F02K 3/075*    (2006.01)
    *F02C 7/042*    (2006.01)
    *F02C 7/14*     (2006.01)
    *B64D 33/02*    (2006.01)

(52) U.S. Cl.
    CPC ............... *F02C 7/14* (2013.01); *F02K 3/075* (2013.01); *B64D 2033/0286* (2013.01); *F05D 2260/20* (2013.01); *F05D 2260/221* (2013.01); *Y02T 50/671* (2013.01); *Y02T 50/675* (2013.01)

(56) References Cited

U.S. PATENT DOCUMENTS

| | | | | |
|---|---|---|---|---|
| 4,782,658 A | * | 11/1988 | Perry | F02C 7/047 60/226.1 |
| 6,070,407 A | * | 6/2000 | Newton | F02K 3/075 239/265.19 |
| 7,461,814 B2 | * | 12/2008 | Hein | B64D 33/02 244/53 B |
| 8,408,008 B2 | * | 4/2013 | Todorovic | F01D 11/24 60/782 |
| 2013/0333390 A1 | | 12/2013 | Barkowsky et al. | |

* cited by examiner

AIRCRAFT TURBINE ENGINE COMPRISING AN AIR INTAKE HOUSING WITH A VARIABLE AERODYNAMIC PROFILE

FIELD OF THE INVENTION

The invention relates to a double-flow aircraft turbine engine. More particularly, the invention relates to an air housing including an air intake opening intended to supply air to a heat exchanger of said turbine engine.

BACKGROUND OF THE INVENTION

A double-flow turbine engine generally comprises an air intake system for supplying air to the systems using air within the aircraft such as, for example, the air pressure renewal and control system in the cabin or, in turn, the defrosting systems. The air intake system draws off hot air at the hot sections of the turbine engine and cold air at the fan duct of said turbine engine. So that the temperature of the air supplied to the aircraft air systems remains lower than a limit temperature, the air intake system comprises an exchanger (PCE) in which the cold and hot air flows are mixed. The cold air is fed to the exchanger via an air passage which connects the exchanger to the fan duct in a fluidic manner. The passage comprises an air inlet opening with a scoop-type operation at its upstream end. This inlet opening is flush with the fan duct wall, in order to reduce its aerodynamic impact, namely its drag. However, with this kind of geometry, an inlet opening cannot capture a sufficient flow of cold air for all applications of the air intake system of a turbine engine with a high bypass ratio (greater than 13:1) in which the temperature of the hot air drawn off can exceed 550° C. (as compared with 450 to 500° C. for other turbine engines). This occurs in particular in extreme operating states of the air intake system, in other words, when the demand of the air-usage systems is high and is combined with a low engine speed.

A solution adapted to turbine engines of this kind to cover all applications of the air intake system would be to arrange a large-sized air inlet opening extending largely within the fan duct and combined with an exchanger with a large exchange surface. This solution is not feasible on account of the limited space available in the turbine engine.

BRIEF SUMMARY OF THE INVENTION

There is therefore a need for an air intake system which is adapted to all engine speeds of turbine engines of this kind. Aspects of the invention may solve this problem. The invention relates to an aircraft turbine engine comprising a fan duct comprising a wall, a flow of passing air, during use, via the fan duct; an air passage arranged in the wall and comprising an air inlet opening at the wall, the air passage being designed to receive part of the flow of air from the fan duct across said opening; the turbine machine comprising an air intake housing located above the air inlet opening and fixed to the wall, said housing being arranged to intercept part of the air flow in the fan duct, said housing successively comprising, in the air flow direction, an upstream wall then a downstream wall, the housing further comprising an upper wall and two side walls parallel to one another, an upstream opening and a downstream opening being arranged on the upstream wall and the downstream wall, respectively, the inside of the housing being hollow and provided with a fluidic communication to the air inlet opening, the housing moreover comprising a movable sealing means between:

a so-called "open" position in which the sealing means completely closes the downstream opening and completely opens up the air inlet opening; and a so-called "closed" position in which the sealing means completely opens up the downstream opening and completely closes the air inlet opening.

The air intake housing according to an embodiment of the invention, including an air inlet opening, therefore operates like a scoop with a variable aerodynamic profile adapted according to the needs of the air intake system, in order to avoid an unnecessary impact on the aerodynamic performance of the turbine engine. In the open position, this scoop allows the air needs of the air intake system to be met, particularly in the event of a slow running engine.

BRIEF DESCRIPTION OF THE DRAWINGS

The characteristics of the aforementioned invention, as well as others, will become clearer on reading the following description of exemplary embodiments, said description being provided in relation to the attached drawings, in which.

DETAILED DESCRIPTION

Figure 1:
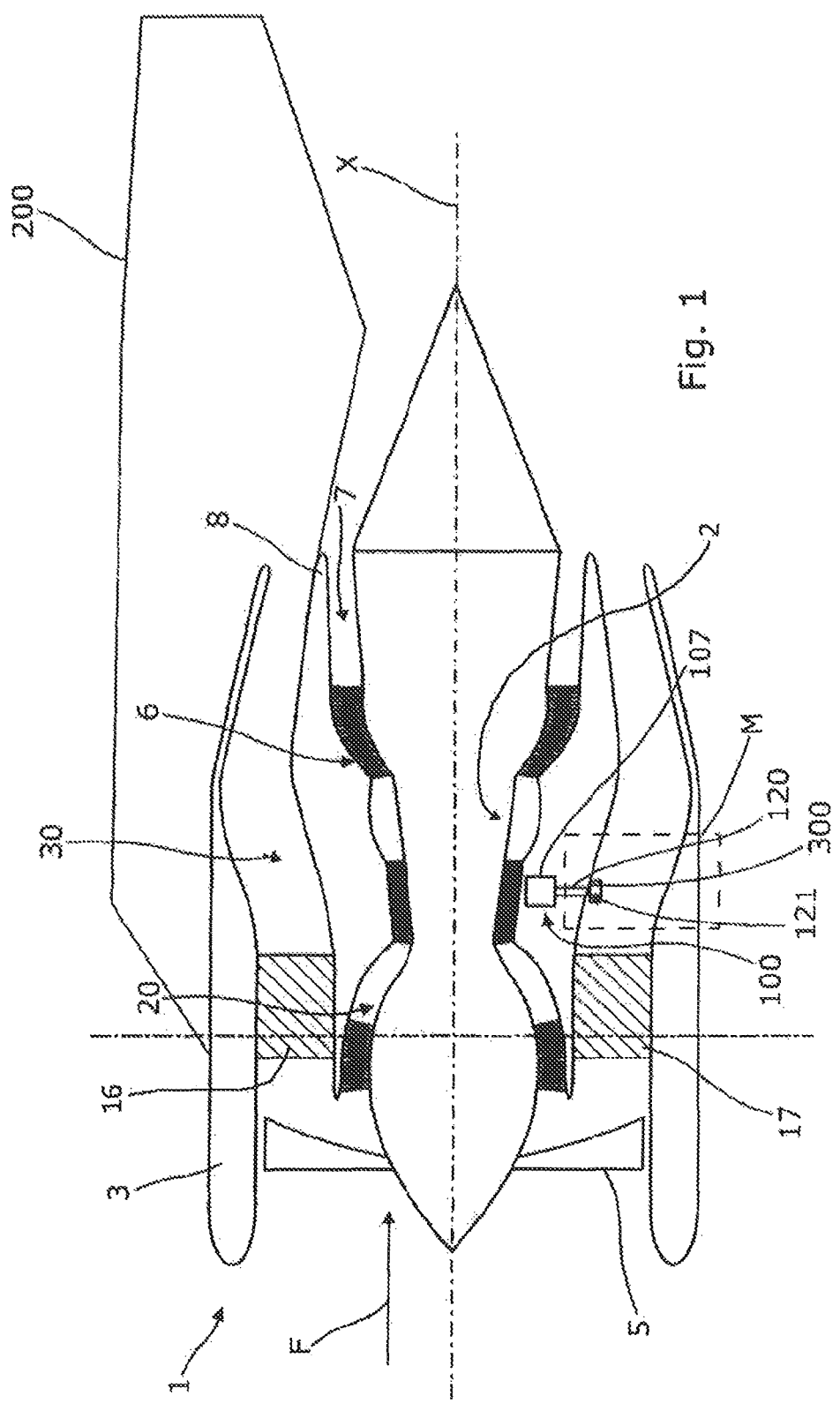
FIG. 1 is a schematic view of a turbine engine depicted in section along its longitudinal axis, the turbine engine comprising an air intake system provided with an air intake housing according to an embodiment of the invention.

With reference to FIG. 1, a double-flow turbine engine 1 comprises an annular nacelle 3 centered on a longitudinal axis X and surrounding an engine 2.

In the flow direction of an air flow crossing the turbine engine 1 and indicated by the arrow F in FIG. 1, the engine 2 comprises, centered on its longitudinal axis X, a fan 5, an engine body 6 and a nozzle 7.

In the following description, the terms "upstream" and "downstream" are to be considered in relation to the flow direction of the air flow (arrow F) crossing the turbine engine 1.

The engine body 6 comprises components allowing the fan 5 to be turned when the engine 2 is started. The turbine engine 1 further comprises, downstream of the fan 5, an annular inter-stream 8 concentric to the engine body 6 and which delimits with said body an annular stream of the hot air flow 20.

The nacelle 3 constitutes the external casing of the turbine engine 1 and surrounds the inter-stream 8 with which it is concentric. The nacelle 3 thereby delimits, along with the inter-stream 8, an annular stream of cold air flow, the so-called fan duct 30. The fan duct 30 extends as far as the nozzle 7. The engine 6 is fixed to the nacelle 3 by means of two diametrically opposed forks 16, 17 which allow mechanical cohesion of the turbine engine 1 to be ensured and particularly link the nacelle 3 and the inter-stream 8 to one another.

Figure 2:
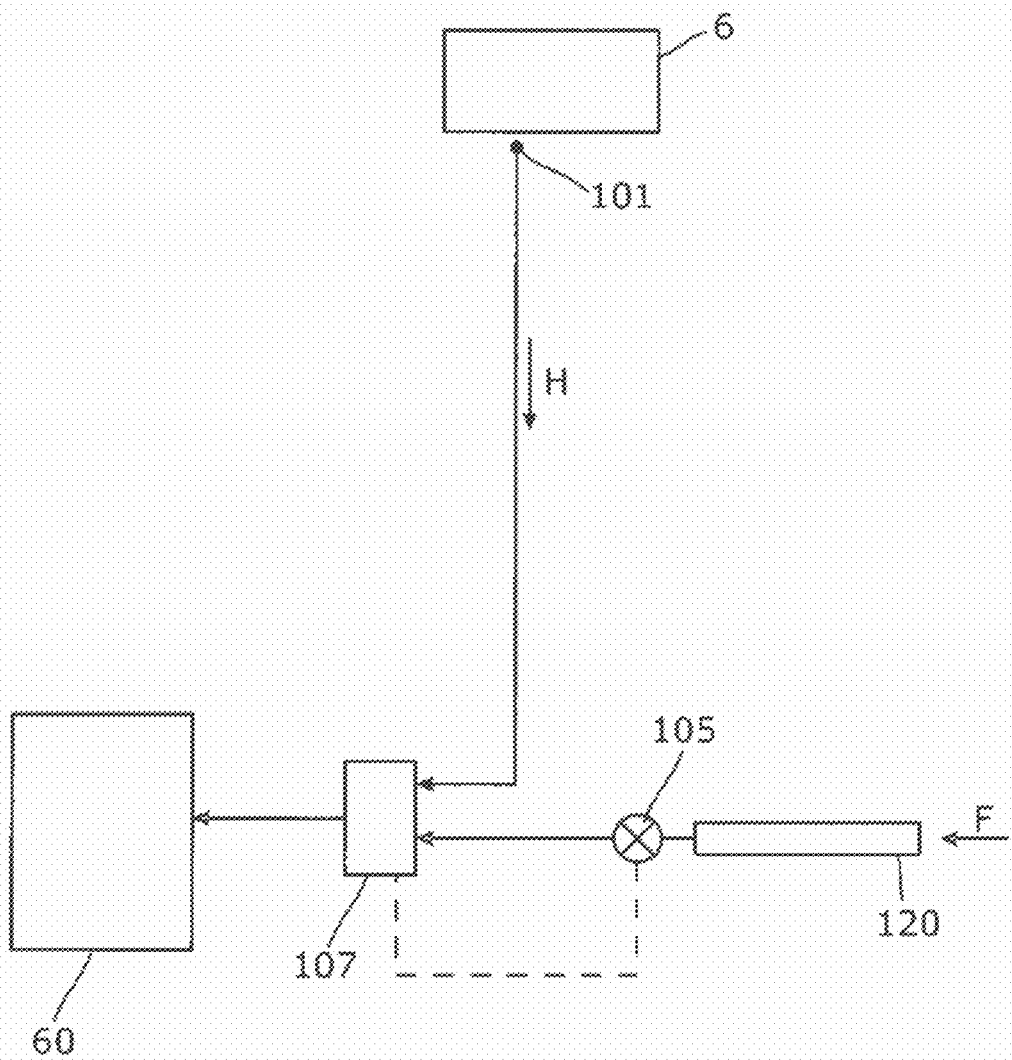
FIG. 2 is a schematic view showing the layout of the different components of the air intake system in FIG. 1.

With reference to FIGS. 1 and 2, the turbine engine 1 comprises in a known manner an air intake system 100, in order to supply one or a plurality of air-using systems 60 with air.

The air intake system 100 comprises, arranged in the thickness of the inter-stream 8, for example:

an exchanger 107 mixing a hot air flow H and a cold air flow F received at exchanger inlets. An exchanger outlet 107 is connected fluidically to at least one air user system 60, arranged in the thickness of the inter-stream 8, for example.

at least one air intake 101 intended to draw off hot air H from the engine body 6 and send it to the inlet of the exchanger 107.

an air passage 120 made in the inter-stream 8 and connecting the fan duct 30 to the exchanger 107 and through which a cold air flow F sent to the inlet of the exchanger 107 passes.

a control valve 105 situated at a downstream end of the air passage 120 between the passage and the exchanger 107. Said valve is fluidically connected to an inlet of the exchanger 107 and its opening angle controlled by the exchanger 107 depending on the needs of the air-using systems 60.

With reference to FIGS. 3 to 6, the air passage 120 is delimited by an air inlet 121 at its upstream end, different passage structures 122 and the control valve 105. The air inlet 121 comprises an inlet opening 121*a* formed between an upstream inlet edge 121*b*, a downstream inlet edge 121*c* and side walls (not shown) connecting the upstream and downstream inlet edges and extending along the longitudinal axis X. In a manner known in the art, the air passage 120 is oriented at an angle α where, for example, a is included between 20° and 70°, in respect of the longitudinal axis X, in order to facilitate the flow of cold air F coming from the fan duct 30.

The air intake system 100 further comprises an air intake housing 300, in a substantially parallelepiped form, for example, housed in the fan duct 30 and arranged above the air inlet opening 121*a*.

The housing 300 is hollow and is delimited by an upstream wall 311, a downstream wall 312, an upper wall 313 and also two side walls 314, 315 (see FIG. 6) parallel to one another.

The housing 300 is fixed, by adhesion or screwing, to the wall 3*a* of the fan duct 30 at the level of these side walls, upstream and downstream. As the dimensions of the housing 300 are greater than the dimension of the inlet opening 121*a* of the air passage 120, the inlet opening is entirely contained between the upstream 311, downstream 312 and side walls of the housing 300. The air passage 120 therefore opens out into the housing 300.

The housing 300 exhibits two openings successively in the direction of the air flow F, an upstream opening 301 arranged on its upstream wall 311 and a downstream opening 302 arranged on its downstream wall 312, respectively. The housing 300 likewise comprises a sealing means and an actuator (not shown) of a pneumatic or electrical type, for example, installed in a receptacle 320 of the housing, said receptacle 320 being adjacent and fixed to the upstream wall 311 of the housing.

The upstream and downstream openings are, for example, slots such as those illustrated in FIGS. 3 to 6, for example. A slot in this case takes up the entire width (dimension along an axis perpendicular to the longitudinal axis X) of the upstream or downstream wall on which it is arranged.

Figure 3A:
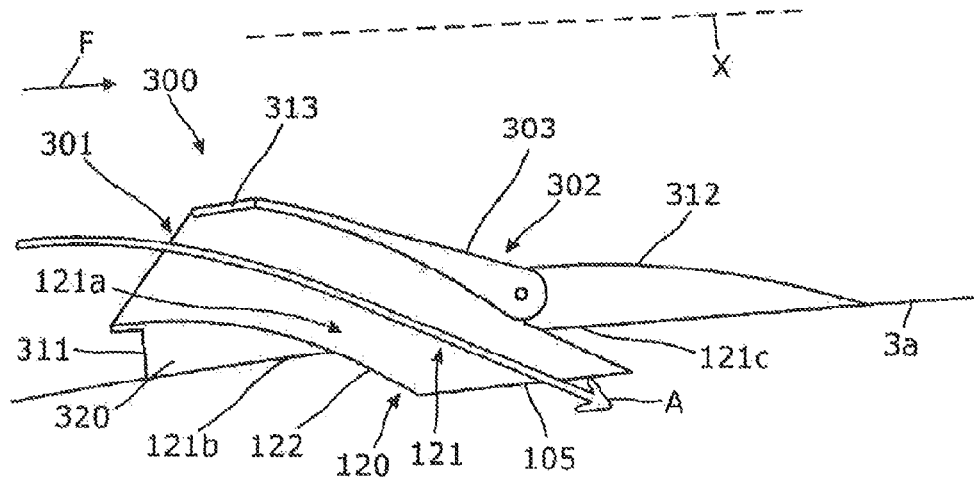
FIGS. 3a, 4a, 5a depict, in a sectional view along its longitudinal axis, different configurations of the housing according to an embodiment of the invention.
Figure 3B:
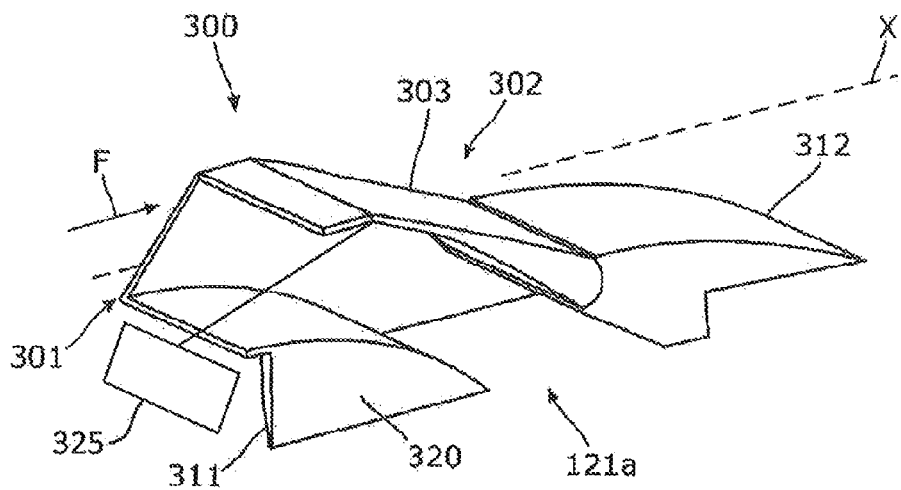
FIGS. 3b, 4b, 5b depict, in a perspective view along its longitudinal axis, the configurations of the housing in FIGS. 3a, 4a, 5a, respectively.
Figure 4A:
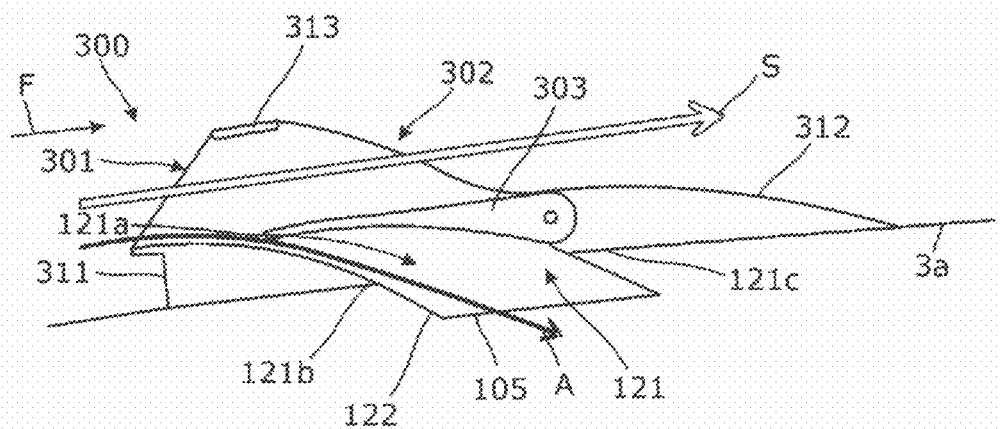
Figure 4B:
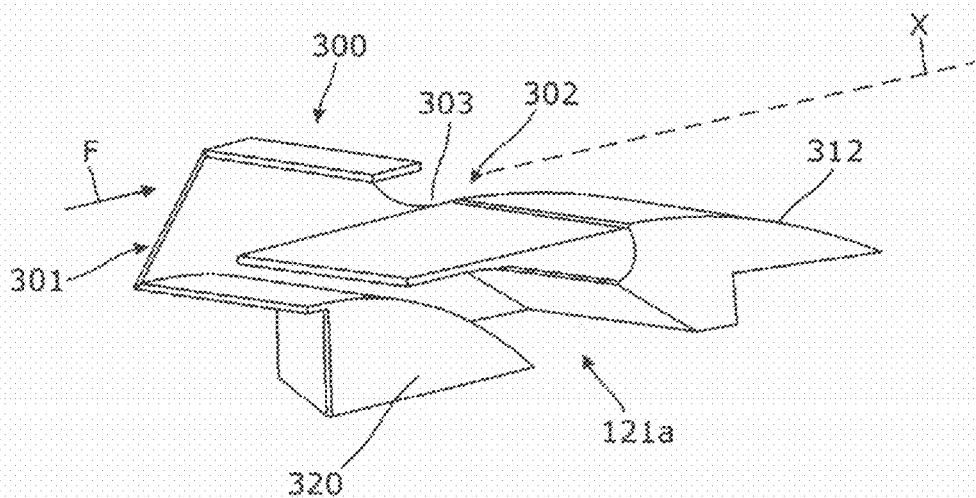
Figure 5A:
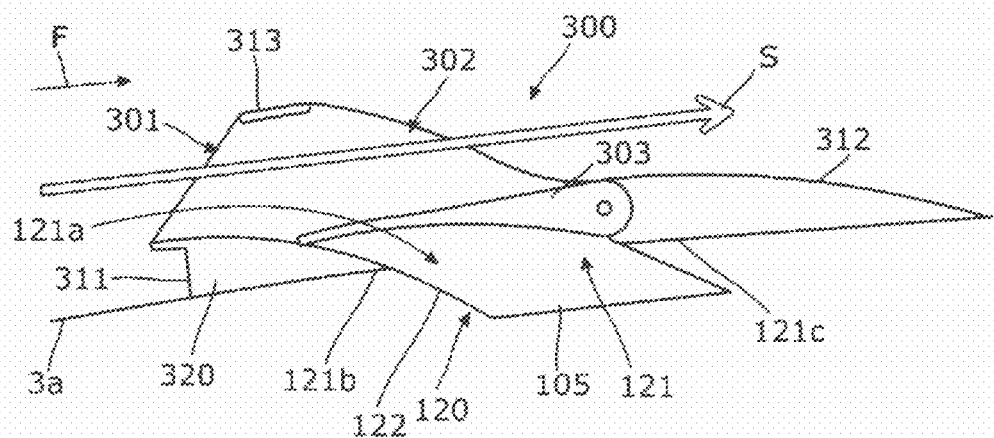
Figure 5B:
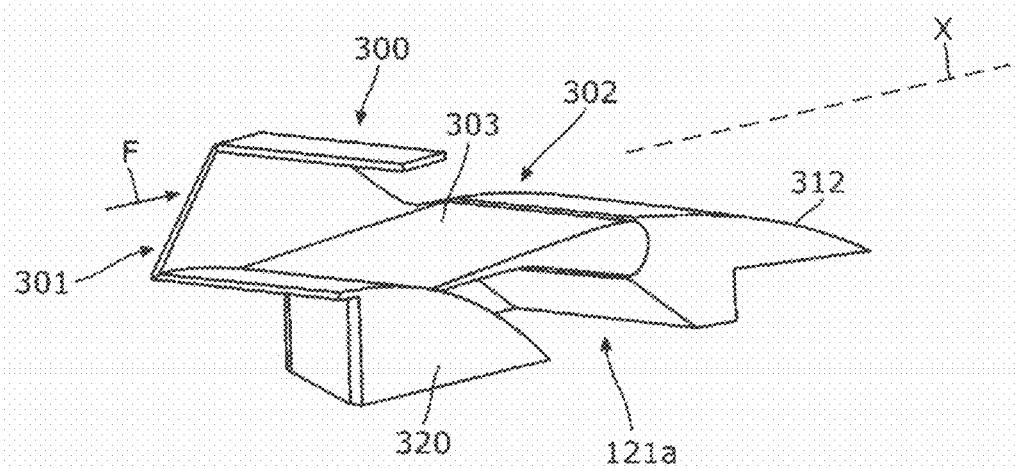

The sealing means 303 takes the form of a substantially planar flap mounted in a pivoting manner on the inside of the housing 300 and hinged on each of the two side walls. The flap 303 can be actuated via the actuator connected to the flap 303 by a rod-type mechanical connecting member (not shown in the figures). The flap 303 is movable between two outer positions:

a so-called "open" position P1 depicted in FIGS. 3*a-b*, in which it closes completely and in a leak-proof manner the downstream opening 302 and completely opens up the air inlet opening 121*a*. In this case, any cold air F entering the housing 300 between the air passage 120 (arrow A in FIG. 3*a*); and a so-called "closed" position P2, depicted in FIGS. 5*a-b*, in which it completely opens up the downstream opening 302 and completely closes in a leak-proof manner the air inlet opening 121*a*. In this case, any air entering the housing 300 is removed through the downstream opening 302 (arrow S in FIG. 5*a*).

The housing 300 thereby forms an air duct through which a cold air flow F moving downstream from upstream in the fan duct 30 fills the housing 300 via the upstream opening 301 and escapes from the housing 300 via the downstream opening (arrow S in FIG. 5*a*) and/or the air inlet opening 121*a* (arrow A in FIG. 3*a*).

When the turbine engine 1 is started, the operation of the air intake device 100, as described above, is as follows: the air is admitted into the turbine engine via the fan 5. Downstream of the fan 5, the cold air flow F passes along the fan duct 30 and part of the air flow enters the housing via its upstream opening 301.

Depending on the air flow required by a user system 60, the controller controls the actuator so that it moves the flap 203 into one of the following positions:

the open position P1: the open position is adopted to achieve a maximum cold air bleed in extreme operating scenarios of the air intake system 100 which occur when the demand of the air-user systems 60 is high and is combined with a low engine speed. It should be noted that this is the position in which the drag caused by the housing 300 is at a maximum.

the closed position P2 in which no fluid is bled through the inlet opening 121*a* and the drag caused by the housing 300 is at a minimum.

an intermediate position P1 (FIGS. 4*a-b*) in which the downstream opening 302 and the air inlet opening 121*a* are partially opened by the flap 303, so as to allow part of the fluid penetrating the housing 300 to emerge through the downstream opening 302 (arrow S) and another part to return in the air passage 120 (arrow A). An intermediate position PI of this kind is appropriate to most engine speeds (for example at cruising speed) of the turbine engine 1, in order to achieve a partial fluid bleed with a greater or lesser degree of opening up of the inlet opening 121*a* depending on the required flow. In this position, the drag caused by the housing 300 depends on the angle of incidence of the flap in relation to the direction of the air flow (arrow F) passing through the fan duct.

The advantage of the invention is that the housing 300 including the air opening 121*a* operates like a scoop having a variable aerodynamic profile adapted according to the needs of the user systems 60, in order to avoid having an unnecessary impact on the aerodynamic performance of the turbine engine 1, particularly at cruising engine speed.

Hence, during normal operating scenarios of the air intake system 100 in which the flap 303 is in the intermediate position P1 or the closed position P2, the drag caused by the housing 300 is limited or zero, respectively, compared with cases in which the flap is in position P1.

In the open position P1, the housing 300 acts as an air scoop that allows the air needs of the air intake system 100 to be met, particularly at slow engine speeds.

Advantageously, the best compromise in terms of the drag caused in position P2/performance as an air scoop in position P1 is reached when the height of the housing 300 measured along a radial direction of the fan duct 30 between the wall 3*a* of the fan duct 30 and the upper wall 313 represents between 5 and 30% of the height of the fan duct 30 in this same direction.

Figure 6:
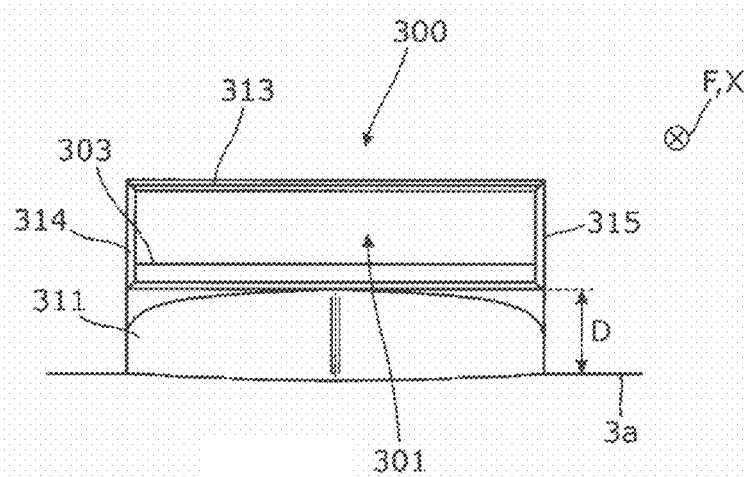
FIG. 6 is a front view of the housing according to an embodiment of the invention.

The upstream opening 301 is preferably situated with reference to FIG. 6 at a height D on the surface of the wall 3*a*. The distance D is calculated such that the upstream opening 301 is located outside the boundary flow layer of the air in the fan duct 30 when the turbine engine 1 is operating (this boundary layer at which the air flow is turbulent being located at the level of the wall 3*a*). Hence, the flow of air entering the housing 300 is laminar, which allows the drag to be minimized when the flap is in configuration P2 or in an intermediate configuration P1.

As a secondary advantage of the invention, it will be noted that when the flap 303 is in position P2 and to a lesser extent in position P1, the air passage 120 receives no or very little air flow from the fan duct 30. Hence, in these positions and when the control valve 105 is closed or virtually closed, an embodiment of the invention allows acoustic cavity resonance phenomena to be limited.

The invention is likewise advantageous in terms of weight saving. In effect, contrary to a flush air opening as known in the prior art, an embodiment of the invention allows improved recovery of the dynamic pressure, which allows the dimensions of the exchanger and, as a consequence, its weight, to be reduced.

Moreover, the installation of the actuator in the receptacle 320 has the effect of facilitating the maintenance and installation of the housing 300, since a faulty actuator can be replaced by dismantling the receptacle 320, without having to uncouple the housing 300 from the wall 3*a* of the fan duct 30. Without exceeding the scope of the present invention, the actuator could likewise be positioned in the thickness of the wall 3*a* or at the level of the downstream wall 312 of the housing.

The upper wall 313, as well as the side walls 314, 315 of the housing 300, is preferably aerodynamically profiled and each wall has an attack edge and an escape edge successively in the direction of the air flow F. This configuration allows the drag caused by the housing to be further limited.

Moreover, and although as described in the preceding example, the air intake system 100 and, particularly, the air passage 120 are arranged in the thickness of the interflow 8, these elements could likewise, and without exceeding the scope of the present invention, be arranged in the thickness of the nacelle 3 or in the mast 200, allowing the turbine engine 1 to be fixed to a wing of the aircraft (not shown). Hence, the invention as described may be configured for turbine engines suspended via different types of masts, including so-called "core" configuration masts, as there is no space taken by the air intake housing 300 in the core compartment zone of the engine.

An air intake housing 300 according to the invention can be "retrofitted" to a turbine engine provided with a flush air opening according to the prior art, in order to include the latter, with a view to meeting the air needs of the air intake systems, solving cavity resonance problems and reducing the weight of the exchanger.

Although the invention is described by application to the air passage of the exchanger of a turbine engine, it likewise applies to the scooping of ventilation air of the engine compartments or equipment installed in the engine compartment zone.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft turbine engine comprising:
   an engine body;
   an annular inter-stream concentric to the engine body; and
   an external casing surrounding the annular inter-stream,
      the external casing and the annular inter-stream defining a fan duct therebetween for receiving a cold air flow, the fan duct comprising a wall,
   wherein the turbine engine further comprises an air intake system arranged in the annular inter-stream, said air intake system comprising:
      an exchanger configured for receiving and mixing a hot air flow and a cold air flow and for providing the mixed air to at least one air user system,
      at least one air intake configured to draw a hot air flow from the engine body and to deliver the hot air flow to the exchanger;
      an air passage arranged in the wall and comprising an air inlet opening at the wall, the air passage being configured to receive part of a cold air flow from the fan duct across said air inlet opening and deliver the part of cold air flow to the exchanger; and
      an air intake housing located above the air inlet opening and fixed to the wall, said housing being arranged to intercept the part of the cold air flow in the fan duct, said housing successively comprising, in a direction of the cold air flow in the fan duct, an upstream wall and a downstream wall;
   the housing further comprising an upper wall and two side walls parallel to one another, an upstream opening and a downstream opening being arranged on the upstream wall and the downstream wall, respectively, the inside of the housing being hollow and provided with a fluidic connection to the air inlet opening, and a movable sealing means having:
      an "open" position in which the movable sealing means completely closes the downstream opening and completely opens up the air inlet opening; and
      a "closed" position in which the movable sealing means completely opens up the downstream opening and completely closes the air inlet opening.

2. The turbine engine as claimed in claim 1, wherein the dimensions of the housing are greater than the dimension of the inlet opening of the air passage, the inlet opening is entirely contained between the upstream, downstream and side walls of the housing.

3. The turbine engine as claimed in claim 1, wherein the sealing means is a flap hinged on each of the side walls of the housing.

4. The turbine engine as claimed in claim 3, wherein the housing comprises an actuator mechanically connected to the flap and configured to move the flap between two outer positions.

5. The turbine engine as claimed in claim 4, wherein the housing comprises a receptacle adjacent to the upstream wall in which the actuator is housed.

6. The turbine engine as claimed in claim 1, wherein, according to a radial dimension, the height of the housing is between 5 and 30% of the height of the fan duct.

* * * * *